United States Patent [19]

Shefbuch et al.

[11] 4,289,424
[45] Sep. 15, 1981

[54] APPARATUS FOR LAYING CONDUIT, CABLE AND THE LIKE IN OR BENEATH FILL MATERIAL

[75] Inventors: Robert J. Shefbuch, Covington, Ohio; Marvin E. Rue, 4285 W. State, Rte. 571, West Milton,, Ohio 45383

[73] Assignee: Marvin E. Rue, West Milton, Ohio

[21] Appl. No.: 109,899

[22] Filed: Jan. 7, 1980

[51] Int. Cl.³ .............................................. F16L 1/02
[52] U.S. Cl. ..................................... 405/179; 405/180
[58] Field of Search ......................... 405/155, 174–183

[56] References Cited

U.S. PATENT DOCUMENTS

| 259,248 | 6/1882 | Wasson | 405/179 |
|---|---|---|---|
| 332,126 | 12/1885 | White | 405/179 |
| 3,849,998 | 11/1974 | Thacker | 405/179 |
| 3,874,182 | 4/1975 | Potter et al. | 405/180 X |
| 4,028,902 | 6/1977 | Coursen et al. | 405/177 |

FOREIGN PATENT DOCUMENTS

| 1801608 | 5/1970 | Fed. Rep. of Germany | 405/177 |
|---|---|---|---|
| 246402 | 6/1969 | U.S.S.R. | 405/179 |

*Primary Examiner*—Ernest R. Purser
*Attorney, Agent, or Firm*—Jerome P. Bloom

[57] ABSTRACT

Apparatus for laying conduit, cable and the like, most advantageously in a trench, features a hopper embodied in a frame adapted to be placed within a trench and loaded with gravel or other embedment material. The construction and placement of the hopper provides for discharge therefrom of the embedment material as the frame is moved the length of the trench, the discharge being to the bottom and at one end of the frame and to a level metered by a readily adjustable control blade. A feed tube extended through the frame and the hopper, to position within the body of the embedment material introduced therein, is provided with a mount enabling its substantially universal adjustment. This feed tube serves to guide and discharge the conduit, cable or the like to be laid simultaneously with the discharge of the embedment material and within and at a predetermined level with respect thereto. The frame per se embodies means for a finish shaping and conditioning of the trench as it is moved while the feed tube serves to provide a firming and compacting action on the embedment material over which it is drawn and to form a nest for the article being laid which facilitates a precise positioning of such article in a substantially straight line path.

33 Claims, 12 Drawing Figures

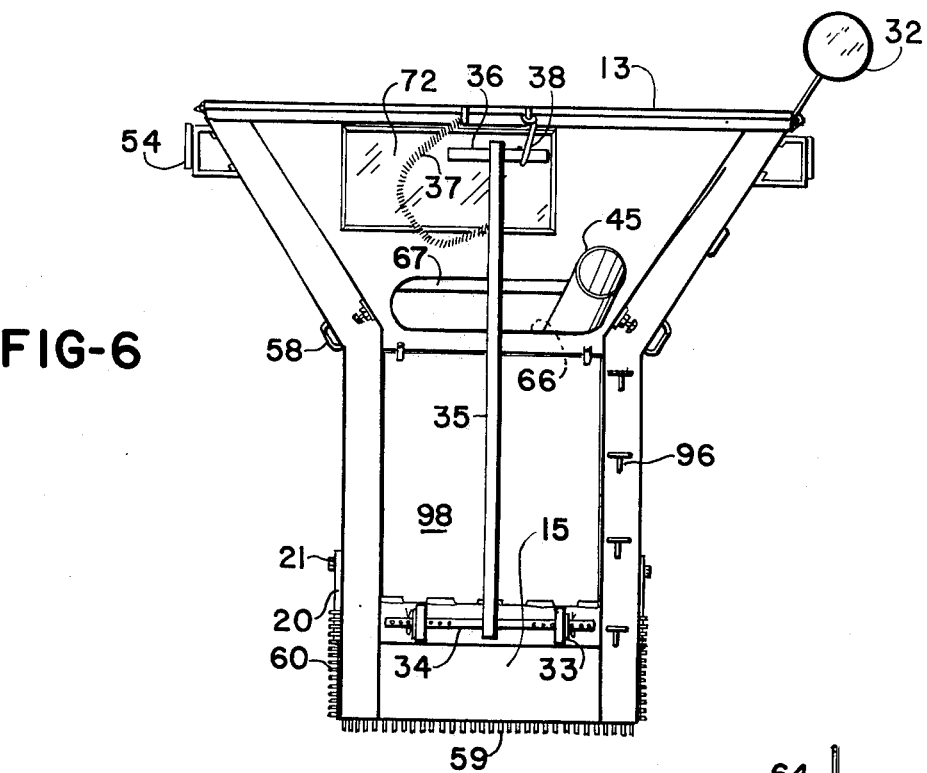
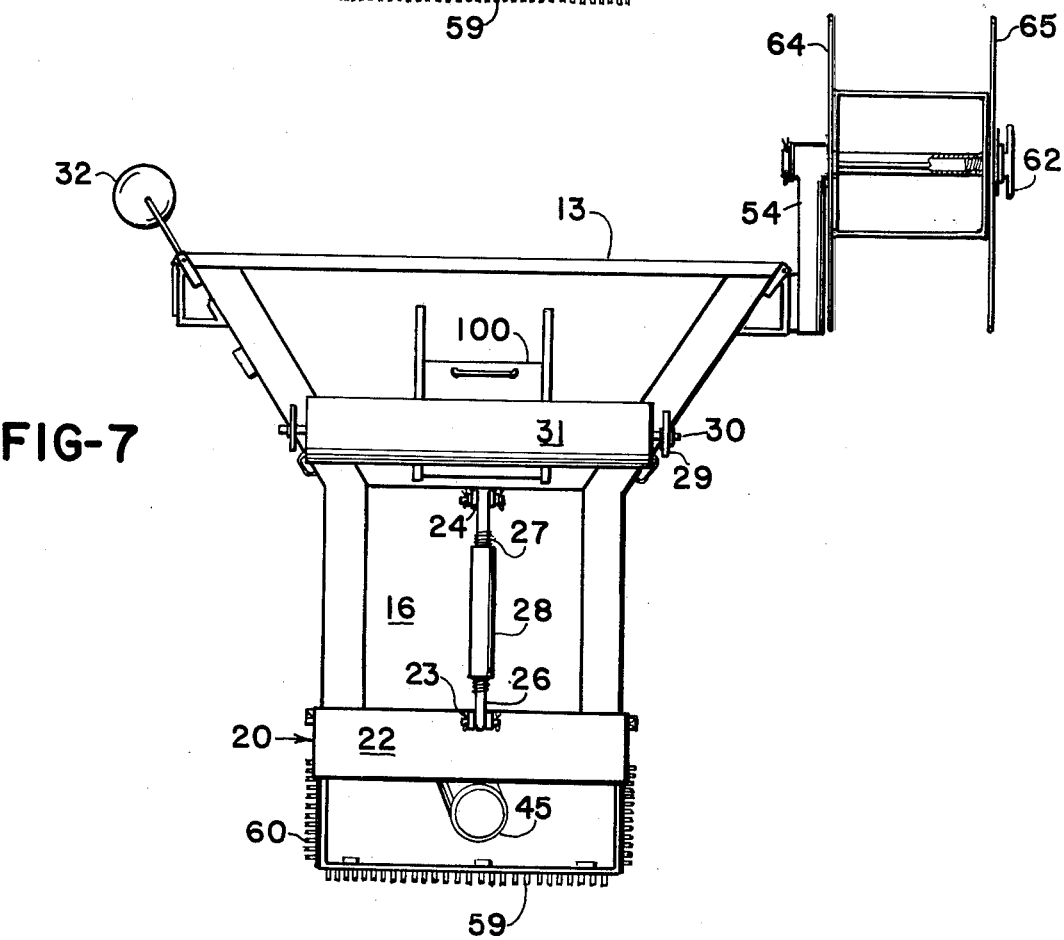

APPARATUS FOR LAYING CONDUIT, CABLE AND THE LIKE IN OR BENEATH FILL MATERIAL

BACKGROUND OF THE INVENTION

This invention relates to improvements in means and methods for laying conduit, cable and like articles, particularly in a trench.

The means and method of the invention not only lend facility in the laying procedure, insure proper positioning of underground utilities and ease the maintenance thereof but also aid in the conditioning of a trench and its shaping. A further benefit is a more precise positioning of the article laid with respect to the level at which it is required to be disposed and that the article, as it is laid, is essentially set with respect to the material which provides its base and/or cover.

Speed, ease and economy are inherent in use of the invention concepts and in such respects they contribute a significant advance in the art.

As far as those substantively involved in the preparation of the present disclosure, the prior art apparatus most pertinent comprises the following:

| | |
|---|---|
| Wasson | 259,248 |
| White | 332,126 |
| Thacker | 3,849,998 |
| Courson et al | 4,028,902 |
| Russian Patent | 246,402 |

The prior art apparatus does not appear to comprehend in their construction or use, in any respect, such a positive control and positioning of articles laid as enabled by the present invention. Nor do they evidence such firmness of seating of the articles laid, as desired in the placement of underground utilities. By virtue of the improvements of the present invention not only is the feed of the article being laid simplified but its environment and positioning is made more certain.

An additional problem evidenced in use of prior art apparatus and/or manual procedures in laying conduit, cable and like articles in a trench is that they overlook the problems created in forming the trench and they fail to take into consideration that the base of a trench must be conditioned as articles are laid therein, in order to avoid a physical environment for the articles laid and the fill material applied which will undesirably affect, eventually, the position of the laid articles and the stability of the fill materials in the trench. This problem is also solved by the use of apparatus constituting embodiments of the present invention.

It is very important to note from the following that the very nature of the apparatus embodiments of the invention not only expedites the laying procedure but minimizes the labor attendant the same, while making the operation thereof more certain and precise.

SUMMARY OF THE INVENTION

A device per the present invention is most advantageously installed in a trench for use thereof. It will be so described, by way of illustration but not by way of limitation.

In a preferred embodiment it comprises a frame to and within which is fixed a hopper having a discharge opening at its bottom, at what constitutes in use its trailing end. The use of the invention apparatus as herein described provides for the original placement of the device within and with its trailing end adjacent one end of a trench, at which point its hopper is loaded with embedment material. The form of the device in preferred embodiment will be such that it substantially fills the trench in which the conduit, cable or the like must be laid. A pivotally connected metering blade serves to control the size of said discharge opening in a manner to effectively control the level of the embedment material discharged from the hopper. The device is designed for movement in and the length of a trench and embodies a tube which extends the length of the frame through the hopper in an orientation providing that its inlet end is uppermost and arranged to open from the leading end of the device while its discharge end is lowermost and projects through and beyond said discharge opening and the trailing end. This tube functions not only to guide conduit, cable and like articles to provide that they are deposited in and the length of the trench but forms a base for such articles as are laid and establishes them in a relatively precise line and at a predetermined level. Flexibility in positioning the articles laid is insured by an essentially universal mount of said tube. In the process of the movement of the device along the length of the trench, the embedment material, which is normally introduced into the hopper after the deposit of the frame in the trench, flows under, about and over the issuing article, to the extent required, to support and/or embed the article at the required level.

The bottom of the device embodies a skid-like control plate which under the influence of the fill material functions to compact and lend a leveling influence to the base of the trench in which the frame is deposited. In preferred embodiments the frame also resiliently mounts rake-like teeth at predetermined locations on its bottom and sides which in the movement thereof along the trench in the laying process insure a degree of porosity of the trench walls and its floor.

The device lends itself also to the provision therein and exterior thereto of mounting and storing means for various articles which are necessary in connection with the preparation for and finishing of a laying procedure. An incident of the improved construction are means facilitating the installation and removal of the device with reference to the trench and its handling in the process.

In the embodiment illustrated a draw bar unit is provided at one end of the frame enabling that it be pulled along the floor of a trench in a following relation to a towing means. Of course the device may be motorized and self propelled but such is not required. As here illustrated, the same machine used to excavate a trench can be used also to pull the device as well as to lower it into a trench and lift it therefrom.

Further features which may be embodied in the invention device are spool means from which the article to be laid may be fed and means for dispensing protective sheet material concurrently with the article being laid.

It is therefore a primary object of the invention to provide means and a method for laying and/or embedding conduit, cable or the like which is more efficient, more economical and more satisfactory in use.

Another object is to make possible a controlled economical and effective use of embedment material in laying conduit, cable and the like in a trench.

A further object is to provide apparatus for and a method of laying and/or embedding conduit, cable and the like at a controlled level within and along a trench, and to do so automatically.

An additional object is to provide a device for placement in and movement along the base of a trench in which is embodied a hopper to store and discharge embedment material to a selected level, which hopper has a tube extended therethrough and arranged to be selectively positioned therein to provide the exit therefrom at one end and in the path of and in advance of the opening from which the embedment material is discharged, at the same time as conduit, cable or the like is fed through said tube to deposit in or on the fill material discharged, at a predetermined level.

Another object is to provide apparatus for introduction in a trench to serve to simultaneously discharge embedment material and conduit, cable or the like at a predetermined level with respect to the embedment material, characterized by means for raking of the trench bottom and the walls thereof to properly condition the same so as to insure a maintenance of the natural soil porosity in use of such apparatus.

A further object is to provide means for a rapid, accurate laying of a line of conduit, cable or the like with minimal manual involvement and considerable speed and economy in the process.

With the above and other incidental objects in view, as will more fully appear in the following specifications, the invention intended to be protected by Letters Patent consists of the features of construction, the parts and the combinations thereof, and the mode of operation as hereinafter described or illustrated in the accompanying drawings or their equivalents.

Referring to the accompanying drawings, wherein is shown one but obviously not necessarily the only form of embodiment of the invention, FIG. 1 is a generally schematic side elevation view of apparatus in accordance with the present invention, parts being broken away and parts being eliminated for clarity of disclosure;

FIG. 6 is a view of what constitutes the leading end of the apparatus illustrated;

FIG. 7 is a schematic view of what constitutes the trailing end of the apparatus illustrated;

Figure 11:
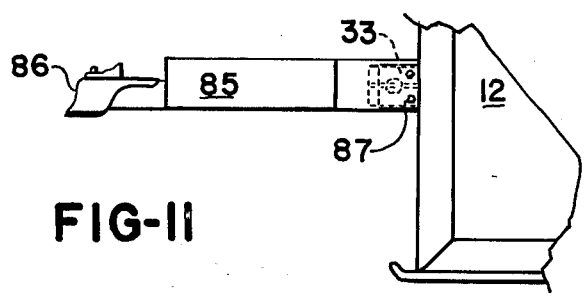
Figure 9:
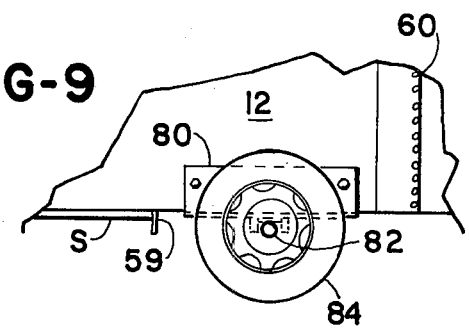
FIG. 9 is a fragmentary view illustrating a dolly arrangement for transport of the above illustrated apparatus, lending it mobility in movement from one site to another.
Figure 12:
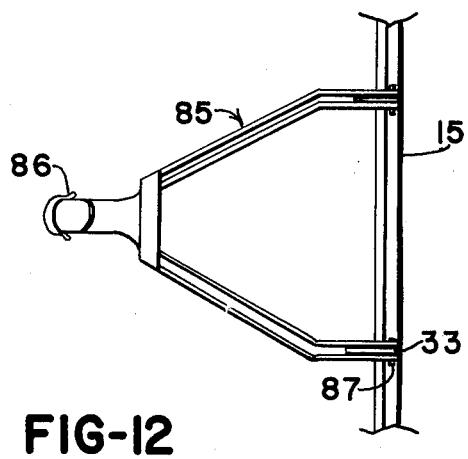

FIG. 11 illustates the application to the leading end of the apparatus illustrated of a towing device, shown in side elevation; and FIG. 12 is a top plan view of the apparatus referred to in the description of FIG. 11.

Like parts are identified by similar reference numerals in the drawings.

DESCRIPTION OF A PREFERRED EMBODIMENT AS ILLUSTRATED

The device constituting an embodiment of the invention herein illustrated is designed to be lowered into a trench and seated to and dragged or propelled along its bottom. As it is moved, it automatically feeds therefrom conduit which may be rigid or flexible pipe, tile, cable, or the like, or for that matter any line designed to form part of an underground utility, while simultaneously discharging embedment material. The arrangement is such to establish the utility pipe, cable or other line which it dispenses at a predeterminable, relatively precise level within the trench.

As seen in the drawings, this device includes a generally rectangular base portion having a hopper shaped, upwardly directed, vertical extension. Its base portion includes a rectangular frame 11 to the outer surface of which is secured rigid metal panels which form therewith a shell-like structure 10 comprising four vertically orienting walls including a leading wall 15, longitudinally extended side walls 12 and a trailing wall 16. The wall structure 10, which is open at its bottom as well as its top, nests therein a downwardly convergent hopper 13. The upper expanded entrance end of the hopper is fixed to the upper end of the wall structure 10, by which it is rimmed. The wall portions of the vertical extension of the base structure 10 provide a vertical extension also of the walls of the hopper 13, including a leading wall portion which is a direct co-planar vertical extension of the wall 15, side wall portions which diverge upwardly and outwardly from the side walls 12 and the side wall portions of the hopper which line their inner surfaces and a trailing wall portion which inclines upwardly, rearwardly and outwardly of the trailing wall 16.

Connected to each of the inner surfaces of each of the opposite sides of the rectangular frame 11, to extend from the upper end of its leading wall 15 where it connects to the hopper and downwardly and rearwardly thereof to the bottom of the frame, at a 45° angle, are transversely aligned rails 18. The rails 18 present co-planar seating surfaces transversely bridged by the inclined leading wall portion 17 of the hopper 13, the other wall portions of which line the interior of the frame 11 to the rear of the wall portion 17. The vertical extension of the structure 10 is so merged therewith and with the nested hopper 13 that its inner wall surfaces effectively define upwardly directed extensions of the inner wall surfaces of the hopper.

The leading half portion of the open bottom of the structure 10 is bridged by a skid plate S the leading end of which extends forwardly of the leading wall 15 to have its projected extremity curve upwardly in front thereof in the manner of the leading end of a ski. The skid plate S serves as a levelling plate and allows for flotation of the superposed structure and any load therein as it is moved over the floor of a soft bottomed trench in which the apparatus is placed. The operative effect of the plate S under load is to cut high spots and fill low spots in the floor of the trench, thereby to improve the definition of the floor as a reference plane.

Fixed along the trailing edge of the skid plate S is a plate or bar spaced longitudinally of which is a series of short closely spaced tines 59 forming a rake which trails and extends below the plate S in the movement of the device 10 in use. A similar rake device similarly embodying tines 60 is mounted to each of the outer surfaces of the side walls 12 to have the tines 60 project outwardly therefrom and perpendicular thereto. The tines 60 are oriented in a common vertical plane which extends transverse to the structure 10 and perpendicular to the plane of its bottom, spaced to the rear of and parallel to the vertical plane of the tines 59. This structure is exceedingly important to the environment of the article being laid, for preservation of its position and function, the tines insuring a conditioning of the soil lining the trench by producing a necessary porosity thereof in the course of their movement the length of a trench. It will be desirable that the bars embodying the tines 59 and 60 are resiliently mounted to deflect in the event they encounter a hard object and this will be provided. Since such arrangement is within the skill of a mechanic, the details thereof are not shown or described.

By virtue of its dimension as well as its inclination and support on and in connection with the rails 18 the front wall 17 of the hopper extends approximately one-half the length of the shell 10, from its leading end. The rails 18 are extended beyond the trailing end of the wall 17, along the bottom of the frame 11, one adjacent each side thereof, to a point immediately of and to the rear of the tines 60. Other than by reason of the extension of the rails 18, to the rear of the wall 17 the bottom of the shell 10 is totally open.

Commencing at a point determined by and extending rearwardly of the rearmost limit of the rails 18, the lower edge portion of the shell-like wall structure 10 and hopper 13, wall portions of the latter of which line the structure 10, including its trailing wall portion 16, are offset and vertically elevated relative to that portion of the lower edge of the structure 10 which constitutes its base, to which is fixed the skid plate S and the device embodying the tines 59. This offset produces what constitutes, in effect, a rectangular cut-out 19 at the rear or trailing end of the box-like device illustrating the present invention, at its base. As so provided the rectangular cut-out defines an opening 19 at its trailing end and bottom for discharge of the contents of the hopper 13 including two differently oriented portions. One portion is bounded by the lowermost edge portions of the wall structure defining the upper limit of the cut-out 19 the plane of which is horizontal. This portion is directly above and elevated from the floor or supporting surface on which the invention device is placed and lends to the discharge of the hopper contents therethrough a vertical component of force influenced by gravity. The second portion defined by the forward limit of the cut-out, which merges with the first portion, is vertical and in facing adjacent relation to the lower end of the inclined front wall portion 17 of the hopper. By virtue of the wall 17, the contents of the hopper which pass through this second portion of the opening 19 have imposed thereon angular, horizontal and rearwardly directed components of force, influencing vertically dropping contents and producing an effective discharge of the hopper contents in the direction of the trailing wall 16 and under and past its lower edge.

The form of the discharge opening 19 limits the level to which any embedment material contained therein is discharged as well as influencing a positive substantially level rearward flow thereof as the device of the invention moves along the floor and the length of a trench.

The discharge opening 19 can be further limited in a vertical sense by a generally rectangular U-shaped plate defining a control blade 20 which embraces the trailing end of the composite wall peripherally enclosing the hopper structure. The blade 20 includes a rectangular plate portion 22 which positions immediately outwardly of and generally parallel to the outer surface of wall 16. The lower edge of plate portion 22 extends over and below the level of the lower edge of the wall 16 as do the lower edges of its perpendicularly related and forwardly projected arms which embrace side walls 12 and have their forward ends pivotally connected to pivot devices 21 projected from the side walls 12. The pivot devices 21 are laterally aligned and positioned at a level immediately above and displaced slightly forward of the cut-out defining the discharge opening 19.

The segment 22 of the control blade 20 mounts a bracket 23 at the center of the upper edge of its trailing surface. The bracket 23 lies in a vertical plane commonly occupied by a similar bracket 24 fixed to project from an upper portion of the wall 16. A turnbuckle type device 25 extends between and is pivotally connected at its respective ends to the brackets 23 and 24. The device 25 (FIG. 3) comprises an intermediate internally threaded sleeve 28 the respective ends of which threadedly connect to threaded ends of bolt-type devices 26 and 27, the remote ends of which are pivotally and respectively connected to the brackets 23 and 24. The turnbuckle device 25 not only suspends and supports control blade 20 which as shown normally bounds the upper portion of the discharge opening 19 but provides facility, on suitable rotation of sleeve 28, to adjust the vertical extent of the discharge opening. This dictates the level to which gravel or other embedment material contained in the hopper may be discharged into the trench in which the invention device is placed.

Figure 2:
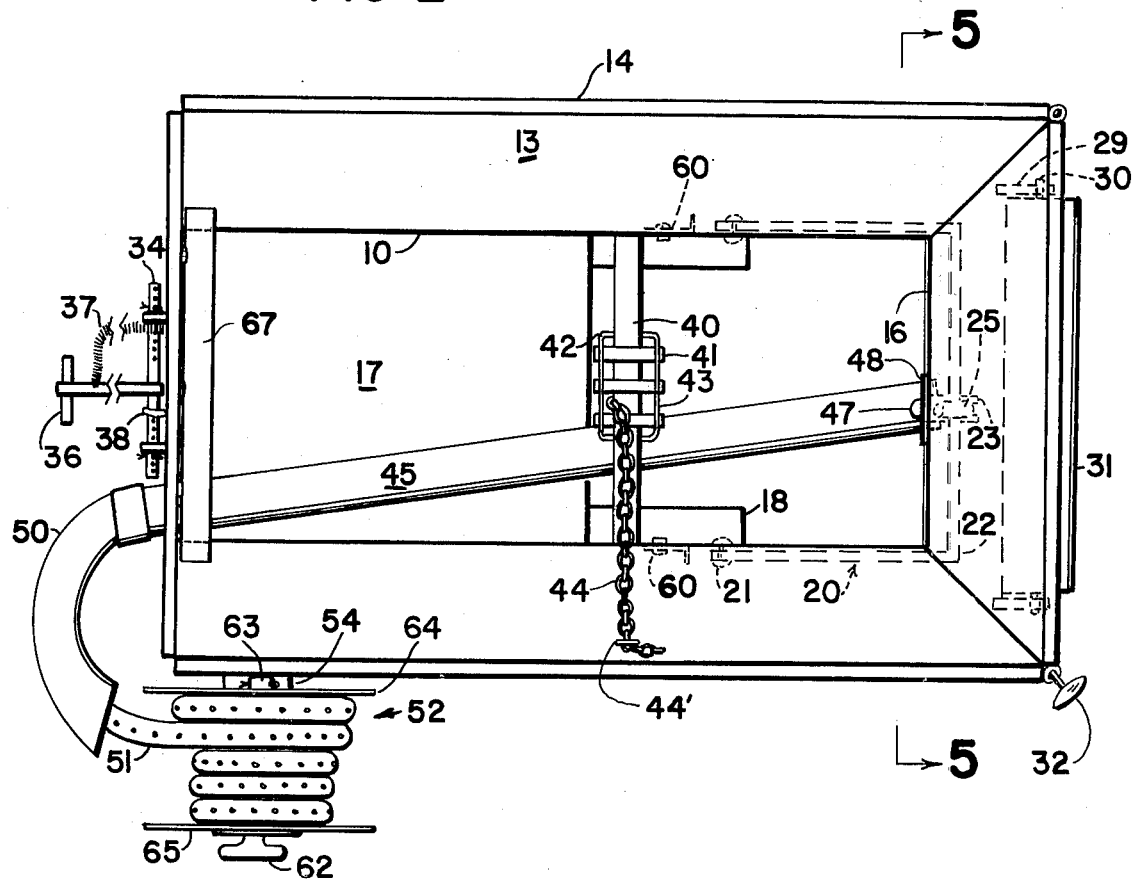
FIG. 2 is a top view of the apparatus of FIG. 1.
Figure 4:
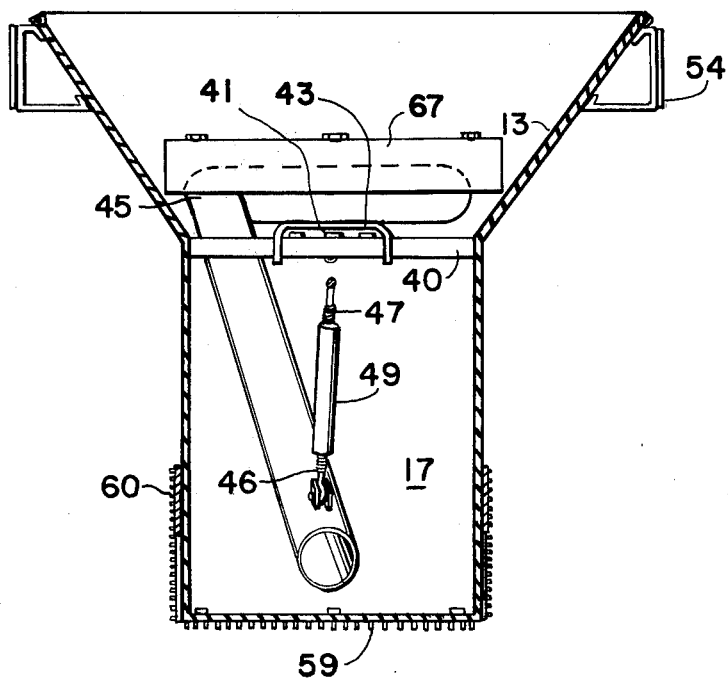
FIG. 4 is a generally schematic cross sectional view taken on line 4—4 of FIG. 3.
Figure 5:
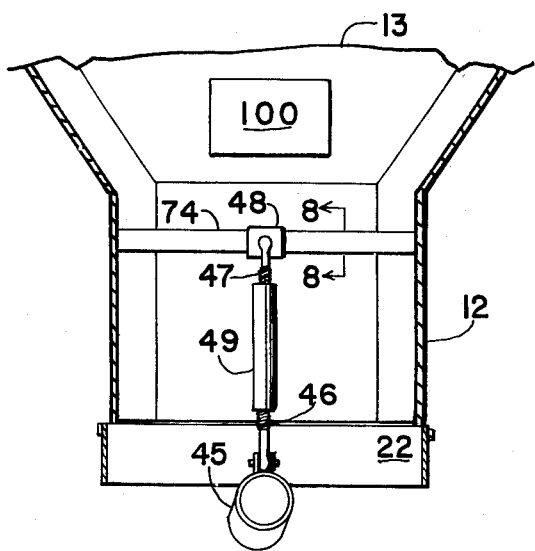
FIG. 5 is a schematic view taken on line 5—5 of FIG. 2.

Formed in the vertical extension of the leading wall 15 is a transversely extending elongated slot 66 which extends substantially from side to side thereof and defines therein a horizontal opening. A guide tube 45 extended through the interior of the hopper 13 has one end uppermost and projected through the slot 66, in the case illustrated, to one end of the slot and slightly outward therefrom beyond the wall 15. As shown in FIG. 2 of the drawings, the tube 45 is angularly positioned in a lateral sense and its end portion uppermost which bears on the wall in which the slot is defined is nested (FIG. 4) in one of the complementary concavely shaped arcuate ends of the slot and held there by the resting thereon of the lower edge of a plate 67. The upper edge of the plate 67 is hinged to the inner surface of the vertical extension of the wall 15 on a line spaced above and parallel to the slot 66 and the plate extends from its hinge under the influence of gravity. The hinged plate 67, as will be obvious, is useful by its weight in holding the portion of tube 45 within the limits of the slot 66 in any selected position in which it may be set to meet the needs of the application. As will be obvious, the arrangement facilitates an optional positioning of the upper end of the tube 45 as it extends through the hopper, in this manner to accommodate the requirement for the lower discharge end of the tube to be in a selected position for discharge of whatever is passed therethrough at a particular location and level within an excavation in which the invention apparatus is placed.

Figure 8:
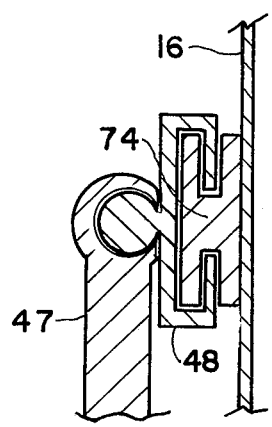
FIG. 8 is a view taken on line 8—8 of FIG. 5.

A second turnbuckle suspension device 46-49 at the trailing end of the hopper pivotally connects at its lower end, by a conventional universal connection, to a bracket fixed on an upper surface portion of the tube 45 immediately forward of the wall 16. The upper end of this turnbuckle fixedly connects to a substantially C-shaped bracket plate 48 mounted for a sliding adjustment on and in connection with an H-shaped bar 74. The bar 74 extends transversely of and is fixed to the inner surface of the trailing wall of the hopper lining the wall portion 16, at a level slightly below that of the bracket 24. As seen in FIG. 8, by virtue of its "H" shape in cross section, the bar 74 has a groove along each of its upper and lower edges by virtue of which the C shape of the bracket plate 48 may wrap around the outer portion of the bar 74 and have its remote extremities engaged in the grooves respectively in the top and bottom of this bar.

The details of the turnbuckles, and particularly the universal pivot portions thereof, are only schematically shown since such detail is well understood by a skilled mechanic.

A bracket on each of the upwardly divergent side wall extensions of the base structure of the invention device, at its outer sides and adjacent the leading wall 15, provides for selective mount of a spool 52 to either side of the device. The location of the spool will be that most closely adjacent the inlet end of the tube 45. As schematically shown, a mast 54 releasably coupled to the appropriate bracket at its base end projects upwardly therefrom to assume a vertical position. A tubular sleeve welded to and defining the uppermost end of the mast 54 is arranged to have its central axis oriented transverse to the device and in spaced elevated relation thereto and to the inlet end of the tube 45. A spool shaft has one end slip fit through the sleeve and is thereby mounted for rotation therein and relative thereto. Washers positioned about the shaft and to either end of the sleeve are contained in bearing relation thereto by application through the shaft of suitable retainers which restrain the shaft from axial displacement relative the sleeve. Fixed to and projected circumferentially of the spool shaft following the washer at the end of the sleeve which is outermost with reference to the device is one side plate 64 of a spool, the hub of which is fixed to project perpendicular to its outer face and about the spool shaft. The outermost end of the spool shaft projects beyond the outer end of the hub and has slip fit thereon the outer side plate 65 of the spool. The plate 65 is clamped to the outer end of the spool and fixed relative to its shaft by a fastener 62, the bolt-like body of which is threaded in the outer end of the spool shaft and the expanded head of which clamps to the outer face of the plate 65. This spool construction facilitates the application to and wrapping about its hub of flexible pipe, cable, or for that matter any similarly coilable article to be fed to and through the tube 45. In the instance illustrated in FIG. 2, the article shown is perforate pipe the nature of which is such to maintain its tubular configuration.

The inlet end of tube 45 is extended by a tubular guide 50 which is arcuately curved and connected thereto by a coupling collar. The nature and application of the collar may be conveniently contrived by any mechanic. Its detail is therefore obvious and not further described. The guide 50 curves outwardly and laterally of the tube 45 and the wall 15 and then reversely to present an expanded entrance end adjacent the spool 52. This arrangement and construction facilitates the insertion and feeding of the flexible pipe 51 illustated, or any like article which can be coiled on the spool.

It is contemplated that the device shown will be moved along the bottom of a trench by towing, using the same excavating machine, such as a backhoe, as is used to prepare the trench in the first instance. To this end brackets 33 arranged in a laterally spaced and aligned relation are fixed to the front wall 15 to have plate portions project therefrom and perpendicular thereto in a line adjacent and in spaced parallel relation to the bottom of the wall. The projected plate portions of the brackets 33 include aligned apertures through which is thrust a rod 34. The rod 34 has a series of equidistantly and longitudinally spaced apertures arranged in each of its respective end portions and mounted in connection therewith at a location centered between its ends the innermost end of a draw bar 35. The end of the draw bar 35 remote from its connection to the rod 34 has thrust therethrough and connected at right angles thereto a short cross bar 36. The cross bar 36 projects equidistantly to either side of the draw bar 35 and orients in a sense parallel to the rod 34. As may be seen in FIG. 6, in a stored relation thereof the bar 35 is pivoted with the rod 34 to an upright position wherein it is substantially parallel to the adjacent surface of the wall 15. In this position it may be retained by engaging to a portion of the cross bar 36 the hook-like extremity of a latch 38 pivotally connected at the upper end of the vertical extension of the base wall 15. As may be seen in FIG. 6, a coil spring 37 has one end fixed also to the vertical extremity of the vertical extension of the wall 15 while its opposite end is connected to an end portion of the draw bar 35 remote from the rod 34. As will be seen, the spring 37 limits the downward pivoting of the draw bar 35 when the latch 38 is released. In its original application the draw bar 35 is centered between the sides 12 bounding the lateral extremities of the wall 15 and fixed in this position by the application through selected apertures in the rod 34 immediately outward of the bracket plates 33 of cotter pins or the equivalent. Lateral adjustment of the draw bar 35, as will be obvious, is achieved by removal of the cotter pins and upon axial adjustment of the rod 34 to position the draw bar 35 where desired, the cotter pins can be replaced by application through those apertures in the rod 34 which are then immediately outward of the bracket plates 33.

As will be seen, the T-shaped head provided at the outer end of the draw bar 35 facilitates the towing of the invention device in use. This will be further described.

Fixed in bridging relation to the side walls of the hopper 13 and the side wall portions of the base wall structure 10, adjacent the upper limits of the side wall portions 12 and parallel to the wall portions 15 and 16 is a cross bar 40. The bar 40 is formed of angle iron and arranged to intersect the vertical line including the center of gravity of the invention device and be substantially perpendicular thereto. The cross section of the bar 40 and its arrangement provides that one arm of the angle iron is horizontal and in line with the upper edge portions of the side walls 12 while the other depends vertically therefrom and has fixed centrally between the ends thereof, at its lowermost edge, one end of a lift chain 44. Fixed over a central portion of the upper surface of the length of the bar 40 and at right angles thereto are a series of longitudinally spaced, horizontally disposed, relatively short bar elements 41. The bars 41 project equidistantly from the bar 40 in opposite directions, on the one hand toward the wall 15 and on the other toward the wall 16. Applied at each of the opposite sides of the bar 40 is a retainer rod 42 the intermediate portion of the length of which loops over and positions in elevated spaced relation to the projected extremities of the bars 41 outwardly of the side of the bar 40 to which it connects. The respective ends of each retainer 42 are bent downwardly and anchored to the underside of the bar 40 at locations spaced outwardly of the bars 41 which its intermediate portion overlaps. The arrangement of the bars 41 and the retainer rods 42 in connection with the bar 40 is such to provide that the composite produces a plurality of vertical passages through which the free end of the chain 44 may be threaded to provide that when the chain 44 is vertically positioned and lifted to apply tension thereto and produce a lifting, the invention device will be essentially balanced as so suspended. The arrangement described can be seen clearly with reference to the view shown in FIG. 2 of the drawings. When the chain 44 is not in use, its free end may be retained in a clip 44' located in line with the cross bar 40 on one of the upwardly and outwardly inclined extensions of the side walls of the hopper provided by the superstructure on the base wall structure 10.

The leading end of the illustrated device includes a storage chamber for tools and accessory parts bounded by the hopper wall portion 17, the skid plate S and the forward portion of the wall structure 10 including the leading wall portion 15. Access may be provided to a lower portion of this chamber by an opening in one side wall portion 12, normally closed by a hinged panel section 55-57 secured by releasable latches 56. As will be obvious, release of the latches 56 permit the panel section 55 to be swung open about its hinge 57. An access opening to the upper portion of the storage chamber is normally closed by a similarly applied and secured panel section 98 of the front wall 15 which is located above the mount for the draw bar 35.

The device of the invention illustrated also includes pocket devices at the upper and outermost edges of its trailing end for selective receipt therein of the base end of a rod the outer end of which mounts, by a universal connection, a mirror 32. This mirror is adjustable so that in a use of the device as it is being towed, the operator of the backhoe or other towing device may visually determine from his seat the contents of the hopper 13 at any given time.

Figure 3:
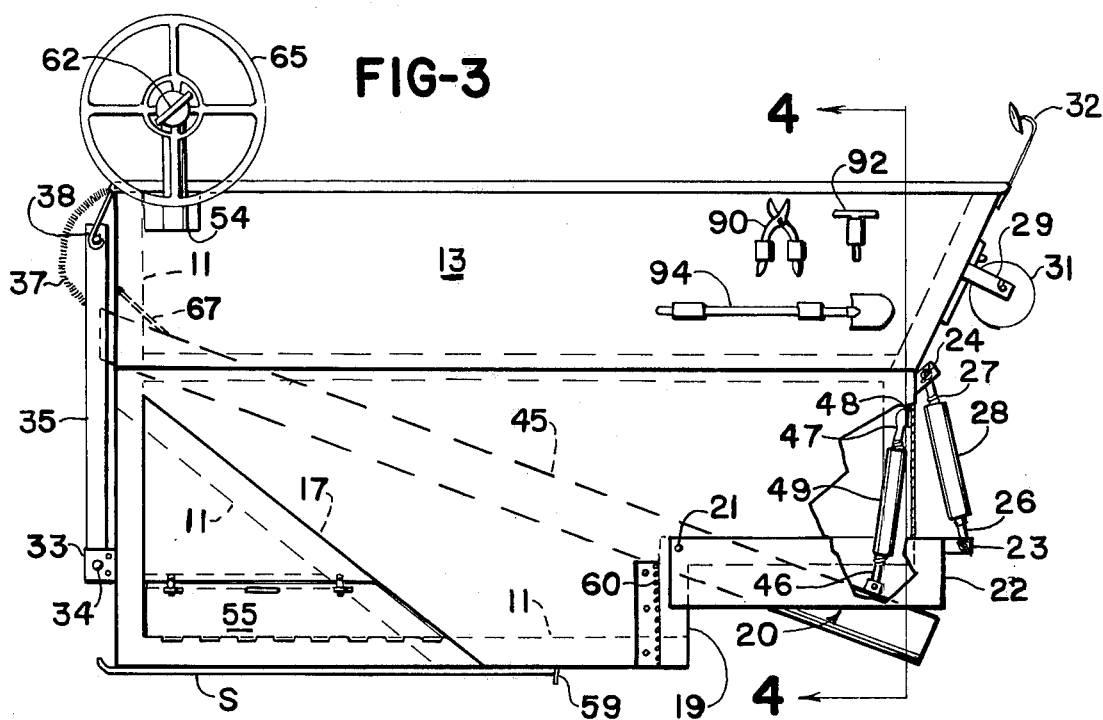
FIG. 3 is a view like that of FIG. 1 showing further detail.

Noting FIG. 3 of the drawings, the vertical extension of one side wall portion 12 of the wall structure 10 mounts a series of sleeves designed to accommodate a slip fit therein and mount thereto of various tools required in the operation of laying an underground utility. This is illustrated by the application to the sleeves of a pair of pliers 90, a T-shaped utility bar 92 and a shovel 94.

An important feature of the invention embodiment is the provision of an opening in the vertical and rearwardly inclined extension of the trailing wall 16. This opening is centered and bounded by guides forming a socket for the vertical slip fit therein of a closure plate 100 for this opening. As will be seen from the side elevation view of the invention device, this opening is inclined over an area of the supporting surface for the invention device which is immediately to the rear of the trailing wall 16 which forms a part of the wall structure 10. Thus, when the device is inserted in a trench adjacent one end wall thereof and flexible pipe is to be laid, for example, the lead end of the pipe passed through the tube 45 and to the rear of the wall 16 will initially have embedment material from the contents of the hopper 13 move thereunder and to the sides thereof. Upon lifting of the door or closure plate 100 from a blocking relation to the inclined opening which it normally seals, embedment material from the upper level thereof within the hopper 13 will drop down and anchor the lead end of the pipe to be laid, whereupon as the invention device is towed forwardly in a trench, the lead end of the flexible pipe 51 will automatically feed out and through the tube 45 from the spool 52, in a manner believed obvious. By the same token, if some of the embedment material is needed for a special fill or for special placement for anchoring purposes, one need merely lift or remove the closure element 100 and have access to embedment material to be shoveled out or otherwise carried for placement where desired.

Incorporated in the invention device and mounted rearwardly of the closure element 100, in spaced relation thereto, is a roll of protective building paper 31 supported on a pivot shaft 30 through the medium of bracket plates 29 projected perpendicularly to the lateral extremities of the vertical extension of the trailing wall 16. As will be obvious, the lead end of the roll of building paper 31 may be anchored over the layer of embedment material and the flexible pipe 51, for example, which may be embedded therein as the laying of the pipe commences, subsequent to which the device will cause the paper to automatically pay out and a complete installation may be effected simultaneously with the movement.

Additional features embodied in the invention device illustrated include steps 96 in connection with one side of the leading wall 15. The steps 96 facilitate servicing of the device in use. Also shown in FIG. 6 are hand holds 58, in connection with the superstructure of the device, which may be used in manipulating and guiding the device into position for placement thereof in a trench or removal thereof therefrom. Included in connection with the upper extremity of the vertical extension of the wall 15 is a map board 72 embodying retention means for securing thereto a map which may be necessary in connection with the laying of the article to be fed through the tube 45.

Figure 10:
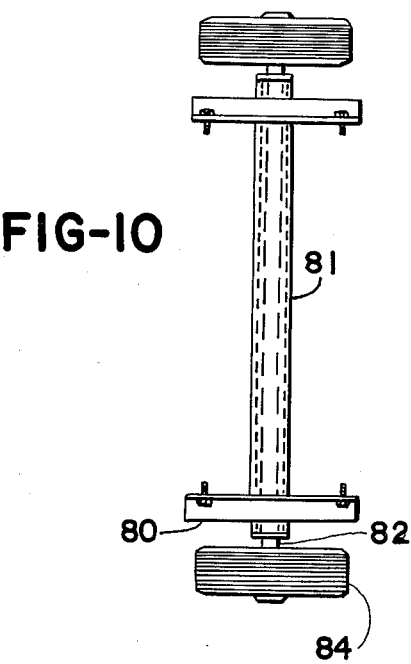
FIG. 10 is a plan view of the dolly employed.

Auxiliary equipment afforded in connection with the invention device is seen in FIGS. 9-12. FIG. 10 illustrates a dolly upon which it can be mounted and by which it can be rendered mobile for movement to or from a place of use. The dolly comprises an axle 82 extending through a sleeve 81 to have its respective ends project therefrom and mount wheels 84. Fixed to the sleeve 81, in parallel spaced relation and respectively adjacent and spaced inwardly from each of its respective ends, are brackets 80 including upstanding plate portions designed to immediately confine therebetween the invention device and abut its side wall portions 12 as the device is seated therebetween on the sleeve 81 and its axle support. The upstanding portions of the brackets 80 receive therethrough screws or like fastening means for securing the same to the side wall portions 12 during transport of the device.

For the purpose of towing the invention device, when supported on the dolly, the draw bar assembly including the bar 35 and rod 34 is removed from the brackets 33, the same being possible by reason of the fact that the bar 35 may be disconnected from the rod 34 whereupon the rod 34 may be slipped out through the openings in the brackets 33. This draw bar assembly having been removed, there is then applied in its place the draw bar 85 illustrated in FIGS. 11 and 12. The draw bar 85 includes divergent rearwardly extending arm portions which terminate in parallel segments having bifurcations which accommodate the slip fit therein of the perpendicularly projected plate portions of the brackets 33 in connection with the wall portion 15. Suitable bolts and nuts are applied to secure the inner ends of the arm portions to the brackets 33 in a manner which is obvious and demonstrated in FIGS. 11 and 12. Connected at the outer convergent ends of the arm portions of the draw bar 85 is a conventional coupling element 86 designed for connection to a ball hitch at the rear end of a towing vehicle.

Figure 1:
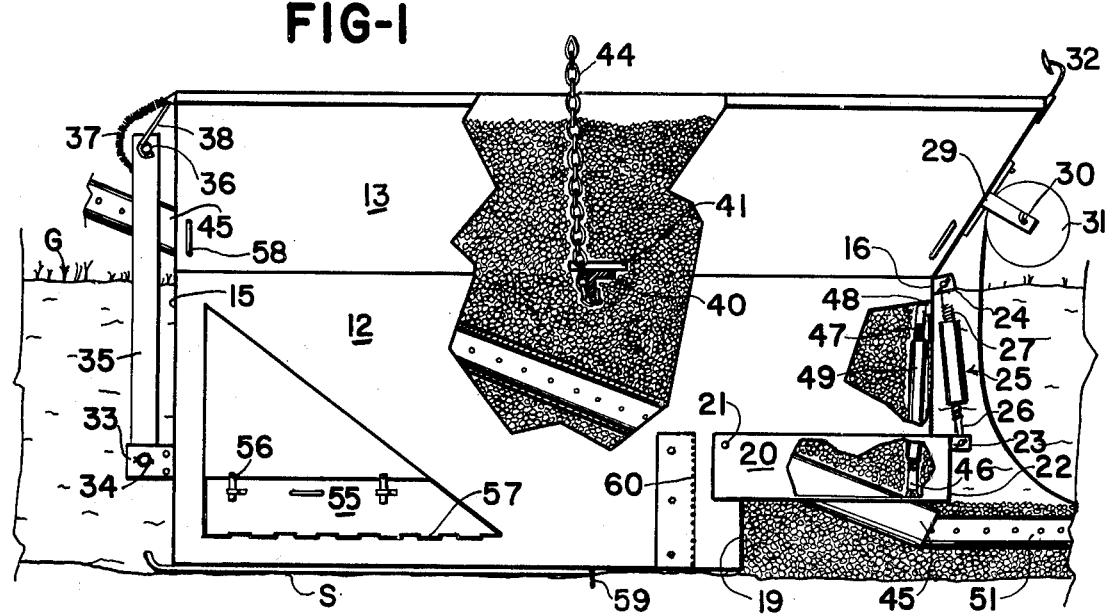

In an application of an invention embodiment in the form illustrated to lay the flexible pipe 51 in a trench, the device may be released and lifted from the dolly used for transport using the chain 44 and the backhoe used for excavation of the trench in a manner believes obvious from the foregoing. The draw bar 85 is, of course, replaced at this time by the assembly including the draw bar 35. For the lifting, the chain 44 will have been appropriately threaded through the proper one of the guide passages defined by the elements 41 and 42 with the cross bar 40 so when suspended the invention device will be balanced. If there is an out of balance situation, one can thread the chain through a different guide passage to provide such balance. In any event, through the medium of the backhoe, or any other equipment suitable for this purpose which is on site, one can lift the invention device over and into one end of the trench in which it is to operate to arrange its trailing end in closely spaced relation to one end wall thereof. The hand holds 58 may be used by available personnel to guide the device into the trench. The device will be designed to essentially bridge the trench as it is deposited on the floor thereof, to rest thereon through the medium of the skid plate S. In the positioning thereof in the trench, the device will present its trailing wall portion 16 in facing spaced relation to the adjacent end wall of the trench. The lead end of the flexible pipe 51 will then be inserted through the guide 50 to be directed thereby back into and through the tube 45. The lead end of the pipe will be projected through the lower output end of the tube 45 immediately to the rear of the wall 16, below its lower limit and under its rearwardly inclined vertical extension. The tube 45 will previously have been adjusted as to its position within and relative to the interior of the hopper and the trailing wall 16 to insure that the flexible pipe will be at a prescribed level when it issues from the tube 45. Note FIG. 1 in this respect.

When deposited in the trench, the hopper 13 is then filled to its upper level with embedment material. As this material falls within the hopper it will fill the area about the tube 45 and move to and through the opening 19 to have a small portion thereof discharge under and to the sides of the projected end of the pipe 51 up to the adjacent end wall of the trench in which the apparatus has been placed and to a level controlled by the setting of the blade 20. To anchor the projected end of the pipe 51, one need merely lift the closure element 100, whereupon a portion of the embedment material in the upper expanded end of the hopper 13 will drop from the hopper to the rear of the wall 16 and over the underlying pipe end. Of course, this material may be spread to insure a firm anchor of the end portion of the pipe 51 thereunder, whereupon, as the device is towed along the trench, the anchor will insure an automatic outfeed of the pipe 51 from the spool 52 by way of guide tube 50 and the tube 45. The outfeed of the pipe 51 will be continuous as long as the invention device is towed forwardly of the trench and away from the end wall thereof adjacent to which it is first deposited.

At the same time that there is an outfeed of the pipe 51 in an automatic response to movement of the invention device, the embedment material will move outwardly from the hopper around the pipe automatically also, and to the level determined by the setting of the control blade 20. As the device is drawn along the trench, the outer projected extremity of the guide tube will in advance of the pipe which it is discharging establish a channel in the embedment material thereunder, firming and compacting the base of the channel in its movement to afford a correspondingly firm and controlled base for the positioning of the discharging pipe 51 within the embedment material and the length of the trench. The projected end of the tube 45 thus arranged serves to create a precise line of deposit of the pipe as well as to establish a relatively firm base therefor to assist in maintaining its position as laid and at the level laid. The control blade 20 serves the basic function of insuring a precise level of the embedment material as far as its elevation with respect to the floor of the trench is concerned, as may be predetermined to suit the requirements of the installation. In the movement of the invention device, the advance portion of its base structure, namely its skid plate S serves, as previously noted, as a compacting and leveling means for the floor of the trench, under the influence of the weight of the superposed structure and its contents. The thus compacted floor surface and the walls of the trench which may have been compacted in the excavating procedure are raked and rendered porous by the tines 59 and 60 in immediately following relation to the skid plate S. The result is a completely porous environment for the embedment material and the pipe being laid.

Simultaneously with the movement of the device, the roll of protective building paper 31, subsequent to its lead end having been anchored at the beginning of the laying operation, will pay out over the established upper level of the embedment material and the pipe laid therein to concurrently complete the installation in the same course of movement and without any additional labor required in this respect after the lead end of the paper is anchored. The laying operation described may be effected in stages or in one continuous motion of the laying apparatus under the influence of its movement, as it is towed by a backhoe or the like. In the case the invention device must be moved from one trench section to another, the towing unit may be brought up out of an end of a trench section in a conventional manner, drawing the device therewith to complete its function within the trench section and thereafter the towing unit may, if required, be disconnected and utilized to lift and reposition the device in another trench section.

One may use any type of tractor, dozer or other suitable vehicle to tow the device as it is applied to a purpose such as above described. The determination in this respect will be guided by the particular application.

It should be noted that plate 67 not only serves a holding function for the upper end of tube 45 but leaves open a portion of the aperture defined by the slot 66 for viewing therethrough of the interior of the hopper from its leading end by the operator of the towing device used in connection with the invention structure.

The device constituting an embodiment of the invention as here described is extremely easy to use and manipulate. It is designed with the utmost simplicity of construction. Where a continuous article is intended to be laid, the laying, once the lead end of the article is readily and suitably fixed, is completely automatic and a consequence of the movement of the device over the surface in, on or over which the article is to be laid. An important feature of the device is of course its ability to condition the surfaces and the side walls of a trench concurrently with the laying procedure. Due to the versatility of the control of the blade 20, the total depth of embedding material deposited can be changed quickly and spillage and waste is completely minimized by virtue of the control of the issuance of the embedment material from the hopper. The multiplicity of settings available for the conduit 45 enables a variation of article placement and the level thereof, of considerable importance in many applications.

The whole apparatus lends itself to economy of function as well as construction, enabling a laying procedure to take place with a minimum of attendant labor and in a considerably shorter period of time than is possible utilizing the prior art equipment.

In use of the invention, the exposure of attendant labor to the dangers and rigors inherent in working in the bottom of excavations, as required in usage of prior art apparatus, is significantly reduced since most of the tasks of attendant labor can now be accomplished on ground level in the immediate area of the excavation and the invention apparatus. The nature and construction of invention embodiments greatly facilitate, moreover, the observance and adherence to OSHA safety standards.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A device for the rapid laying of an article in a simultaneously deposited layer of embedding material, including a structure having opposite ends, one of which is a leading end and the other a trailing end, said structure containing within the bounds thereof a hopper for holding a supply of embedding material, an article feeding tube extending through the interior of said hopper to have its inlet end located adjacent said leading end of said structure and its output end adjacent said trailing end, means defining an exit opening from said hopper and from said structure for embedding material within said hopper to discharge from said trailing end adjacent said output end of said feeding tube, the output end of said tube extending to and through said exit opening, said tube and said exit opening being arranged at said trailing end to provide that in the movement of said device over a supporting surface there is a continuing deposit on such surface of a layer of embedding material concurrently with a continuing deposit of the article issuing from said tube within or on said layer of discharged embedding material.

2. A device as in claim 1 including means to control the depth of said embedding material as it is discharged and to establish a selected level thereof above the surface on which the material is deposited.

3. A device as in claim 1 or claim 2 wherein said tube is arranged to form a nest in the discharging embedding material for the article issuing therefrom, the base of which nest is firmed thereby in the movement of said device over its supporting surface.

4. A device as in claim 1 wherein said structure has a substantially rectangular configuration, a lower part of its trailing end is cut away to define said exit opening and said tube is positioned to incline downwardly from said leading end of said structure to said trailing end and to have its output end project through to the outermost limit of the said exit opening.

5. A device as in claim 1 including draw bar means in connection with said leading end portion of said device constructed for the coupling thereto of a towing device, said draw bar means being mounted for a selected lateral adjustment thereof with reference to said structure to which it is releasably coupled.

6. A device as in claim 5 wherein said draw bar means is mounted for a selected lateral adjustment thereof with reference to said structure to which it is releasably coupled.

7. A device as in claim 1 including means for use in imparting mobility to said device including skid plate means on an underside portion of said structure serving as its base constructed and arranged to cut high spots and fill low spots in movement of said structure along a supporting surface.

8. A device as in claim 7 wherein tine means carried by said structure in following relation to said skid means, having regard to direction of movement of said device over a supporting surface, are constructed to rake said surface in advance of the deposit thereon of a layer of embedding material by way of said exit opening, which follows said tine means.

9. A device as in claim 1 wherein said structure embodies means for producing a porosity of its supporting surface in movement thereon.

10. A device as in claim 1 wherein said structure embodies in releasable connection therewith a roll of protective sheet material for covering said embedding material as it is discharged, and the article deposited therein or thereon, a leading end of said protective sheet material being extensible to position over deposited embedding material and be anchored thereto, whereupon said sheet material will automatically dispense over the embedding material and the article deposited therein or thereon in response to the movement of said structure over its supporting surface.

11. A device as in claim 1 wherein said structure includes a shell-like rectangular wall remote end portions of which define the said leading and trailing ends thereof and at least one wall of said hopper lines said trailing end of said shell, said hopper and said shell-like rectangular wall having superstructure defining a vertical extension thereof a trailing wall portion of which inclines upwardly and outwardly of said trailing end portion and over the supporting surface of said structure outwardly thereof and embodies a supplementary normally closed opening for use in discharging hopper contents to the rear of said structure.

12. A device as in claim 11 wherein the opening to said hopper for introduction therein of embedding material is substantially coextensive with the portion of the shell uppermost from the supporting surface.

13. A device as in claim 11 wherein said hopper and said shell-like rectangular wall have superstructure defining a vertical extension thereof a trailing wall portion of which inclines upwardly and outwardly of said trailing end portion and over the supporting surface of said structure outwardly thereof and embodies a supplementary normally closed opening for use in discharging hopper contents to the rear of said structure.

14. A device as in claim 1, said structure being comprised of a rectangular frame having closure panels fixed to sides thereof and a bottom closure, said bottom closure extending from the leading end of the structure toward but terminating short of the trailing end to define a downwardly facing aperture means through which embedding material in said hopper has access directly to a supporting surface, and the closure panel at the trailing end of said structure extending toward but terminating short of the frame bottom to define in the lower part of the trailing end a rearwardly facing aperture means which in conjunction with said downwardly facing aperture means forms said exit opening.

15. A device as in claim 14, an upper margin of said rearwardly facing aperture establishing a maximum depth of a deposited layer of embedding material, and an adjustable control blade extending in a sense transverse to said rearwardly facing aperture to vary the depth of a deposited layer to lesser limits than an upper limit as represented by said maximum depth.

16. A device as in claim 14, the bottom closure including a skid applying the weight of said structure to a supporting surface and working said surface in response to movement of said structure thereover.

17. A device as in claim 1 wherein means mounts said feeding tube for movement of the inlet end thereof to one of a plurality of positions.

18. A device for the rapid laying of an article in a simultaneously deposited layer of embedding material, including a structure having opposite ends, one of which is a leading end and the other a trailing end, said structure containing within the bounds thereof a hopper for holding a supply of embedding material, an article feeding tube extending through the interior of said hopper to have its inlet end located adjacent said leading end of said structure and its output end adjacent said trailing end, means defining an exit opening from said hopper and from said structure for embedding material within said hopper to discharge from said trailing end adjacent said output end of said feeding tube, and means for the variable positioning of said tube at its output end with reference to said exit opening.

19. A device as in claim 18 including means to control the depth of said embedding material as it is discharged and to establish a selected level thereof above the surface on which the material is deposited.

20. A device for the rapid laying of an article in a simultaneously deposited layer of embedding material, including a structure having opposite ends, one of which is a leading end and the other a trailing end, said structure containing within the bounds thereof a hopper for holding a supply of embedding material, an article feeding tube extending through the interior of said hopper to have its inlet end located adjacent said leading end of said structure and its output end adjacent said trailing end, means defining an exit opening from said hopper and from said structure for embedding material within said hopper to discharge from said trailing end adjacent said output end of said feeding tube, the trailing end portion of said structure having the bottom thereof elevated with reference to its base which is provided by the leading end portion of said structure and said exit opening being comprised of two portions one of which is defined in said bottom of the said trailing end portion and the other of which is in a plane perpendicular to said base and in merging relation to said one portion of said opening to form a continuation thereof.

21. A device as in claim 20 including means pivotally mounted thereto to selectively block a portion of said exit opening and provide a predetermined and relatively precisely controlled level of the embedding material in the course of its discharge.

22. A device as in claim 21, said pivotally mounted means being a control blade positioning rearwardly of and transverse to said exit opening and adapted to be raised and lowered to vary the depth of embedding material deposited on a supporting surface, and means to effect raising and lowering movements of said control blade including extensible and retractable means acting as a rigid link between said control blade and a stationary part of said structure in any selected position of adjustment thereof.

23. A device as in claim 20 wherein said structure has a configuration providing for its deposit in and in a substantially bridging relation to the side walls of a trench and means are provided in connection with said structure for conditioning the surface of said trench in movement thereof along the length of the trench in which it is placed.

24. A device for the rapid laying of an article in a simultaneously deposited layer of embedding material, including a structure having opposite ends, one of which is a leading end and the other a trailing end, said structure containing within the bounds thereof a hopper for holding a supply of embedding material, an article feeding tube extending through the interior of said hopper to have its inlet end located adjacent said leading end of said structure and its output end adjacent said trailing end, means defining an exit opening from said hopper and from said structure for embedding material within said hopper to discharge from said trailing end adjacent said output end of said feeding tube, said structure having a substantially rectangular configuration, a lower part of its trailing end being cut away to define said exit opening and said tube being positioned to decline from said leading end of said structure to said exit opening at the trailing end thereof, and said leading end of said structure being constructed and arranged to provide for the mount of said inlet end of said feeding tube at selected laterally displaced positions.

25. A device as in claim 24, wherein said leading end of said structure has a laterally elongated slot accommodating the projection therethrough of said inlet end of said feeding tube, said inlet end being slidably positionable in said slot, and means tending to retain said tube inlet end in positions to which it may be set in said slot.

26. A device according to claim 24, and means making the output end of said feeding tube dependent from the structure substantially at the trailing end thereof, said last named means enabling said output end to be adjusted in plural senses within said exit opening in any lateral position of said inlet end.

27. A device as in claim 24 including suspension means constructed and arranged to position and reposition said output end of said tube with respect to said exit opening and in outwardly projected relation thereto, the positioning of said output end of said tube providing that it may serve as a channeling device in the movement of said structure along its supporting surface, concurrently with the discharge of said embedding material and the deposit on and/or embedding therein of the article issuing from said feeding tube.

28. A device as in claim 27, said means to position and reposition the said output end of said feeding tube being operable to change the position of said output end in both vertical and horizontal senses.

29. A device for the rapid laying of an article in a simultaneously deposited layer of embedding material, including a structure having opposite ends, one of which is a leading end and the other a trailing end, said structure containing within the bounds thereof a hopper for holding a supply of embedding material, an article feeding tube extending through the interior of said hopper to have its inlet end located adjacent said leading end of said structure and its output end adjacent said trailing end, means defining an exit opening from said hopper and from said structure for embedding material within said hopper to discharge from said trailing end adjacent said output end of said feeding tube upon a supporting surface, and means for a balanced lifting and lowering of said structure from and to a supporting surface including a chain and means for directing said chain in different paths in the use thereof to insure a substantially balanced state of said device in the lifting and lowering thereof despite variations in its weight distribution, as may be occasioned by its particular construction.

30. A device as in any one of claim 20 or claim 29 including means for storing a supply of the article to be deposited on or in the embedding material and means for directing the article from said storing means to and through said tube in response to movement of said structure along its supporting surface after a lead end of said article is anchored with respect to its supporting surface.

31. A device for the rapid laying of an article in a simultaneously deposited layer of embedding material, including a structure having opposite ends, one of which is a leading and the other a trailing end, said structure containing within the bounds thereof a hopper for holding a supply of embedding material, an article feeding tube extending through the interior of said hopper to have its inlet end located adjacent said leading end of said structure and its output end adjacent said trailing end, means defining an exit opening from said hopper and from said structure for embedding material within said hopper to discharge from said trailing end adjacent said output end of said feeding tube, and said leading end of said structure being constructed with an elongate slot accommodating the projection therethrough of said inlet end of said feeding tube, plate means being arranged to position over said slot, at least in part, to inhibit the displacement of that portion of the feeding tube within the slot from the position at which it is set.

32. A device as in claim 31 wherein said plate means is hinged to a portion of the leading end of said structure above said elongate slot a portion of which provides an aperture for viewing the interior of said hopper.

33. A device for the rapid laying of an article in a simultaneously deposited layer of embedding material, including a structure having opposite ends, one of which is a leading end and the other a trailing end, said structure containing within the bounds thereof a hopper for holding a supply of embedding material, an article feeding tube extending through the interior of said hopper to have its inlet end located adjacent said leading end of said structure and its output end adjacent said trailing end, a lower part of said trailing end being cut away to define an exit opening from said hopper and from said structure for embedding material within said hopper to discharge from said trailing end adjacent said output end of said feeding tube onto a supporting surface, said feeding tube inclining downwardly from said leading end of said structure to said trailing end to have its output end project to the outermost limit of said exit opening, and suspension means constructed and arranged to position and reposition said output end of said tube with respect to said exit opening and in outwardly projected relation thereto.

* * * * *

UNITED STATES PATENT AND TRADEMARK OFFICE
CERTIFICATE OF CORRECTION

PATENT NO. : 4,289,424
DATED : September 15, 1981
INVENTOR(S) : Robert J. Shefbuch and Marvin E. Rue It is certified that error appears in the above-identified patent and that said Letters Patent are hereby corrected as shown below:

Col. 7, line 52, "conveniently" is corrected to read
-- conventionally --;

line 58, "illustated" is corrected to read
-- illustrated -- .

Col. 11, line 8, "believes" is corrected to read -- believed --.

Claim 6 is deleted.

Claim 12 is deleted.

Claim 13 is deleted.

Signed and Sealed this

Nineteenth Day of January 1982

[SEAL]

Attest:

Attesting Officer

GERALD J. MOSSINGHOFF

Commissioner of Patents and Trademarks